(12) United States Patent
Lorch

(10) Patent No.: US 6,325,295 B1
(45) Date of Patent: Dec. 4, 2001

(54) CARTRIDGE FOR SANITARY FITTINGS

(75) Inventor: Werner Lorch, Schramberg (DE)

(73) Assignee: Hansgrohe AG, Schiltach (DE)

( * ) Notice: Subject to any disclaimer, the term of this patent is extended or adjusted under 35 U.S.C. 154(b) by 0 days.

(21) Appl. No.: 09/487,413

(22) Filed: Jan. 18, 2000

(30) Foreign Application Priority Data

Jan. 19, 1999 (DE) .............................................. 199 01 851

(51) Int. Cl.⁷ .................................................. G05D 23/13
(52) U.S. Cl. .......................................... 236/12.2; 137/269
(58) Field of Search ...................... 236/12.2; 137/625.41, 137/269, 271

(56) References Cited

U.S. PATENT DOCUMENTS

| | | | |
|---|---|---|---|
| 5,340,018 | * 8/1994 | MacDonald | 236/12.2 |
| 5,341,845 | 8/1994 | Graber | 137/625.41 |
| 5,535,943 | 7/1996 | Kahle et al. | 236/12.2 |
| 5,890,508 | * 4/1999 | Powell | 137/269 |
| 5,988,202 | * 11/1999 | Spitzer, Sr. | 137/269 |

FOREIGN PATENT DOCUMENTS

| | | |
|---|---|---|
| 648 390 A5 | 3/1985 | (CH) . |
| 28 04 803 A1 | 9/1979 | (DE) . |
| 35 10 009 A1 | 6/1986 | (DE) . |
| 42 08 241 A1 | 9/1992 | (DE) . |
| 43 00 183 A1 | 7/1994 | (DE) . |
| 196 48 114 A1 | 5/1998 | (DE) . |
| 0 560 737 A2 | 9/1993 | (EP) . |
| 05 57 696 A1 | 9/1993 | (EP) . |
| 05 60 737 A2 | 9/1993 | (EP) . |
| 08 44 421 A1 | 5/1998 | (EP) . |
| WO 98/35280 | 8/1998 | (WO) . |

\* cited by examiner

Primary Examiner—William E. Tapolcai
(74) Attorney, Agent, or Firm—Duane Morris

(57) ABSTRACT

A cartridge for a sanitary fitting contains within a cartridge casing a distributor, which can be rotated with the aid of a control grip. A rotation of the distributor leads to a rotation of a rotatable control disk of a disk control, which is replaceably placed in the cartridge casing. By replacing the disk control or only a single disk of the disk control, the valve characteristics can be modified. The cartridge has a compact construction and can be adapted to different functions.

13 Claims, 3 Drawing Sheets

CARTRIDGE FOR SANITARY FITTINGS

It is known to construct the actual control elements for a sanitary valve in the form of a cartridge, which can then be inserted in the fitting body.

The problem of the invention is to provide a cartridge which, in the case of compact construction, offers the possibility of implementing different types of sanitary fittings with limited effort and expenditure.

To adapt the cartridge to different functions, it is only necessary to replace one or optionally also several parts of the control device.

The base terminating the cartridge casing serves to form the connection between the water passages of the control device and the channels in the fitting body. The universality of the cartridge proposed by the invention is further improved if it is also possible to replace the base. By replacing the base it is possible to modify a cartridge and place it in the same fitting body and also use the unmodified cartridge for another fitting.

According to a further development of the invention, the rotary movement of the distributor casing is limited by a stop. It is particularly appropriate to allow e.g. the stop fitted to the distributor casing to cooperate with part of the control device and which is replaced for bringing about a different valve characteristic.

According to the invention a thermostat can be placed in the cartridge.

According to a further development, in the distributor casing is placed a distributor having water ducts or passages, through which the water introduced into the valve e.g. flows to the thermostat and from there back to the control device and the cartridge base.

The invention proposes that the water axially enters and leaves the cartridge. This makes it possible to achieve a space-saving, compact construction of the cartridge, which can be inserted in a compact fitting casing. Generally there is plenty of space in the axial direction.

According to the invention the control device can have a disk system. Such disk systems are known in the case of single lever mixing valves and other valves. They normally contain a fixed control disk, also called a distributor disk, as well as a movable control disk in contact therewith. The invention more particularly proposes that the movable control disk can be constructed so as to rotate about a fixed axis. Rotation can take place directly through the distributor casing. To the distributor casing can be connected an actuator, e.g. in the form of a control grip.

According to the invention the control device can have a quantity control, in which the actuation leads to a change in the flow cross-section and therefore a change in the quantity of water passing out of the sanitary fitting per unit of time.

It is also possible for the control device to contain a changeover device for changing between different outlets from the fitting. According to a further development, the changeover device can be actuated with the same actuator as that with which the quantity control is actuated. It can in particular be provided that for actuating the changeover device the actuator is actuated in the same way as for modifying the quantity setting. For example, a rotation beyond a specific position can lead to a changing of the outlets, said position preferably being such that several outlets are closed.

Further features, details and advantages of the invention can be gathered from the following description of a preferred embodiment with reference to the attached drawings, wherein show:

FIG. 1 An axial section through a cartridge according to the invention.

FIG. 2 An axial section through a distributor casing.

FIG. 3 An axial section through a distributor located in the distributor casing.

FIG. 4 A front view of the distributor of FIG. 3.

FIG. 5 A second axial section through the distributor of FIG. 2 in a different plane.

FIG. 6 Diagrammatically the control device for a first sanitary fitting.

FIG. 7 A view of a second sanitary fitting corresponding to FIG. 6.

FIG. 8 A view of a third sanitary fitting.

FIG. 9 Perspectively a movable control disk.

FIG. 10 Perspectively a view of a distributor disk, as used in the fitting according to FIG. 7.

FIG. 1 shows in an axial section through the armature axis the construction of a cartridge according to the invention. The cartridge contains a cartridge casing 1, which is constructed as a cylindrical sleeve, which has on both the outside and the inside a shoulder 2, 3. With the aid of the outer shoulder 2 the cartridge casing I can be fixed in a fitting body, e.g. with the aid of a plate 4, which is firmly screwed down by a screw 5, as is illustrated diagrammatically bottom left in FIG. 1. The cartridge casing 1 is surrounded by a protective sleeve 6, which optically covers the cartridge. The protective sleeve 6 extends to below the edge 7 of a control grip 8, which is used for actuating the cartridge.

A distributor casing 9, constructed as a cylindrical sleeve, is mounted in rotary manner in the cartridge casing 1. A slide and guide ring 10 is inserted between the distributor casing 9 and the cartridge casing 1. The axial position of the distributor casing 9 is fixed in one direction by an engagement of a shoulder 11 on the inner shoulder 3 of the cartridge casing 1. In the other direction fixing takes place in that the distributor casing 9 engages on a fixed control disk 12, which forms part of a control device 13 of the cartridge. The fixed control disk 12 rests on a base 14, which is axially secured at the outer end of the cartridge casing 1.

FIG. 2 shows details of the distributor casing 9. As stated, over most of its longitudinal extension the distributor casing 9 is constructed as a cylindrical sleeve and at the end associated with the control device 13 is provided a diameter increase forming the aforementioned shoulder 11.

At the opposite end the distributor casing 9 has an internal thread 15, which is located at a point where the distributor casing 9 has a greater wall thickness. The internal thread 15 does not extend right up to the end of the distributor casing 9.

In the vicinity of the thread 15 is formed in the outside of the distributor casing 9 a circumferential groove 16, which serves to determine the axial position of the control grip 8.

According to FIG. 1, in the internal thread 15 of the distributor casing 9 is screwed an insert 18, accompanied by the interposing of a packing or seal 17, which rotates on rotating the casing 9. The insert has a mounting support, in which a rotating spindle 19 is mounted in rotary manner. The rotating spindle 19 is axially secured and projects out of the insert 18 with a toothed lug 20. The rotating spindle 19 is internally hollow and in said cavity 47 is housed in axially displaceable manner a sleeve body 21. The sleeve body 21 has on its outside, outside the rotating spindle 19, an outwardly directed flange 22.

The insert 18 contains an internal thread 23 in engagement with a nut 24. The nut 24 is axially displaceable, but rotationally secured on the outside of the rotating spindle 19. A rotation of the rotating spindle 19 leads to a rotation of the nut 24 which, due to the engagement in the internal thread 23, is then axially displaced and engages on the flange 22.

The sleeve body 21 houses a thermostat 25, which is fixed between two springs 26, 27. The spring 27 presses the thermostat into the sleeve body 21, so that the latter is also moved in the direction of the upper end in FIG. 1. For the rotation of the rotating spindle 19 the control grip 8 contains a second grip 28, which is in rotary engagement with the toothed lug 20.

The thermostat 25 displaces a valve body 29, which in known manner opens and closes two annular slots as valve seats. The thermostat 25 with its valve body 29 and the associated valve seats is located in a cage fixed within a distributor 30. The distributor 30 forms water passages, which guide the water entering the cartridge to the thermostat 25 and then from the latter back to the control device 13. Details of the distributor can be gathered from FIGS. 3 to 5 to which reference is now made.

The distributor 30 has a roughly sleeve-like construction and is so dimensioned that, accompanied by the interposing of a seal, it can be slid from below into the distributor casing 9 (FIG. 2). At its end associated with the control device 13 it contains four axial lugs 31, one of which is somewhat longer than the three others. In its cylindrical area the distributor 30 contains two slots 33, 34, which are located at different axial positions and serve to ensure that the inflowing water passes to the thermostat 25. One of the two slots is intended for cold water and the other for hot water.

From the end associated with the control device 13 two channels 35 lead from the face 36 to the outside of the distributor 30. These two channels are separated from one another by an external subdivision. In the face 36 are formed grooves 37, in which is inserted a shaped seal 38, which can be seen in FIG. 4. It is also possible to see in the latter that access is obtained through a central opening 39 to the interior of the distributor 30, whilst the two channels 35 are separated from one another by partitions 40.

The distributor is placed in the interior of the distributor casing 9 and the thermostat 25 in the interior of the distributor 30. Then, on the face 36 of the distributor 30 is placed a rotatable control disk 41, visible in FIG. 1, accompanied by the interposing of a seal 38. The correct rotary position of said movable control disk 41 is ensured by notches of differing width, which cooperate with the projections 31 of the distributor 30. On the rotatable control disk 41 is then placed the fixed control disk 12, whose correct position is also ensured by notches of differing width in the outer circumference thereof. The extended lug 32 of the distributor 30 then comes to rest in an arcuate groove 42 of the fixed control disk 12, which leads to a rotation angle limitation for the rotation of the control disk. The groove 42 only extends over part of an arc, e.g. over 90°.

The control grip 8 is firmly screwed to the distributor casing 9 with the aid of a screw 43, whose inwardly directed end engages in the groove 16. This fixes the axial position of the control grip 8. A rotation of the control grip 8 leads to a rotation of the distributor casing 9 and consequently to a rotation of the distributor 30, which in turn drives the rotatable control disk 41. The cartridge base 14 has several openings 44, as do the fixed control disk 12 and rotary control disk 41. As a function of the position of the rotary control disk 41 water can pass through the channels 35 into the distributor casing and then out of the latter again in the direction of the arrow 45. By replacing the rotatable control disk 41, the fixed control disk 12 and/or the base 14 it is possible to adapt the characteristics of the cartridge to different applications. Examples for some of the possible types of sanitary fittings are given in FIGS. 6 to 8.

FIG. 6 shows an arrangement in which there are two arcuate slots as ports in both the rotary and the fixed control disks. The distributor can be rotated about an angle. With increasing rotation the cross-section of the inlet openings and outlet openings is further increased, so that this rotary movement represents a quantity control. The associated rotatable control disk 41 is shown in FIG. 9. The side seen in FIG. 9 is the upper side in FIG. 1.

Figure 1:
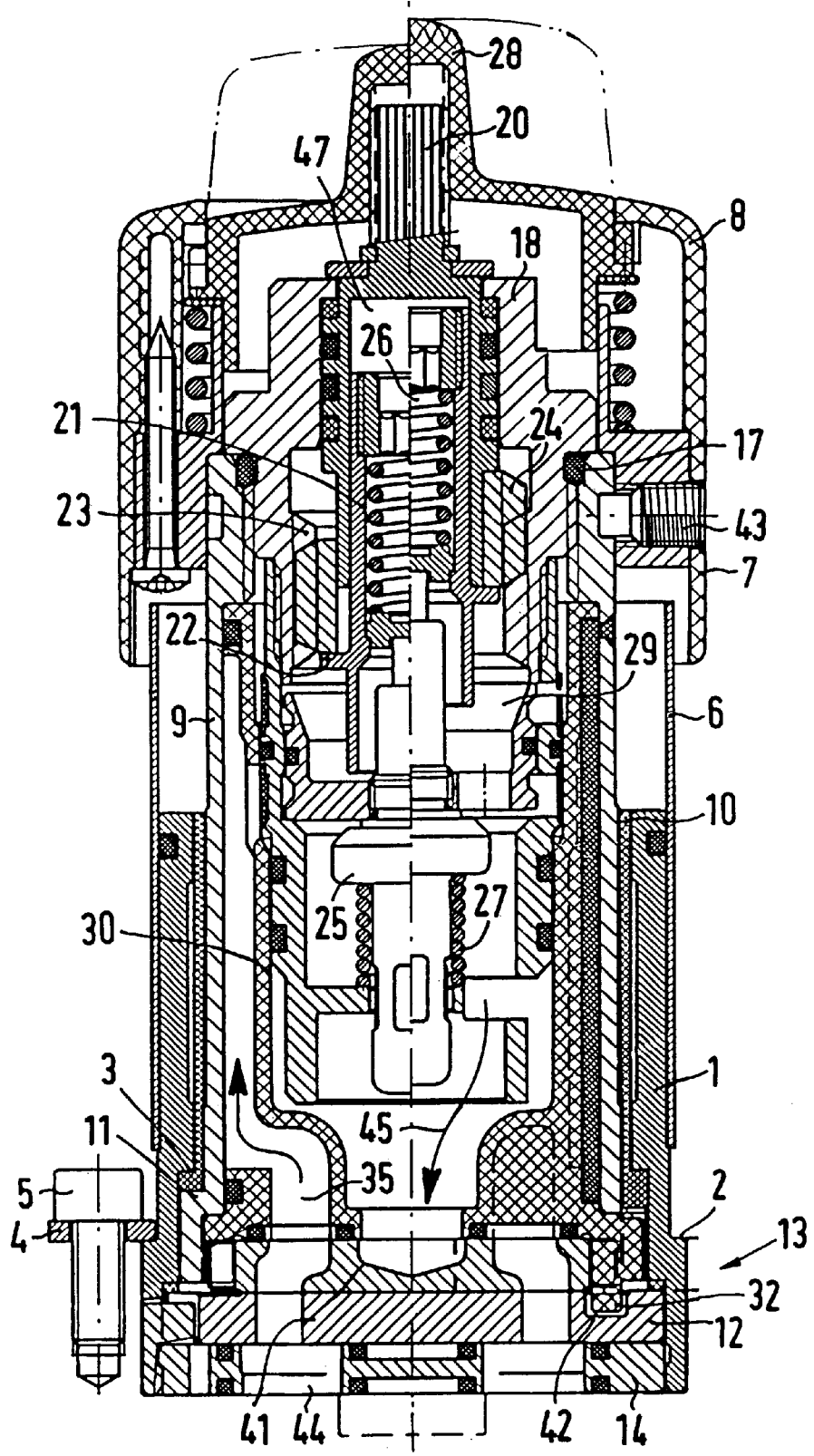
Figure 4:
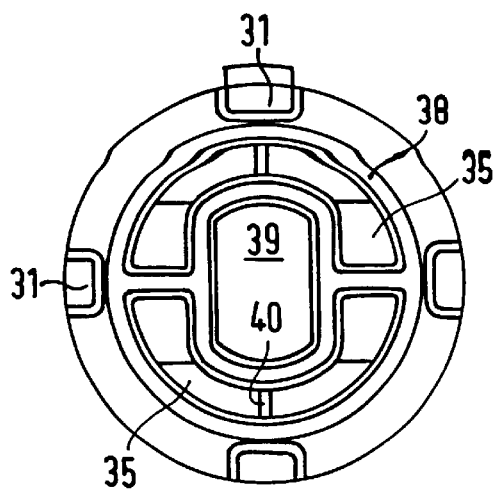
Figure 5:
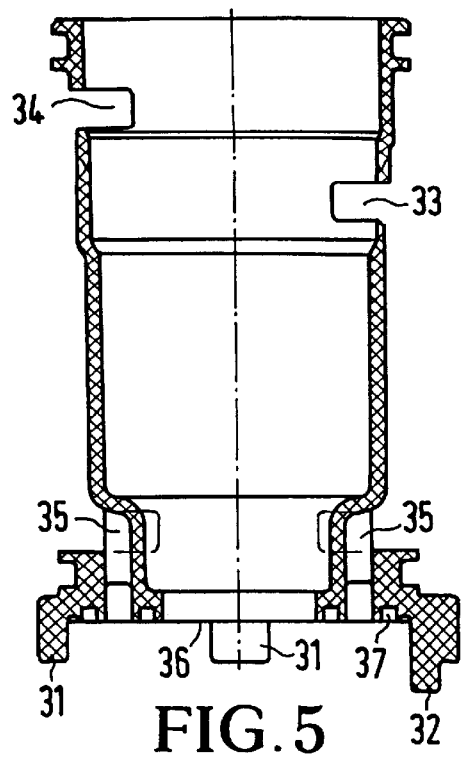
Figure 3:
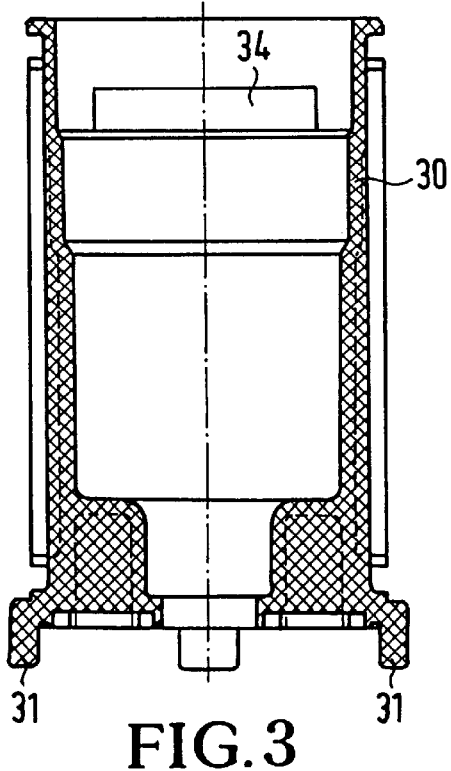
Figure 2:
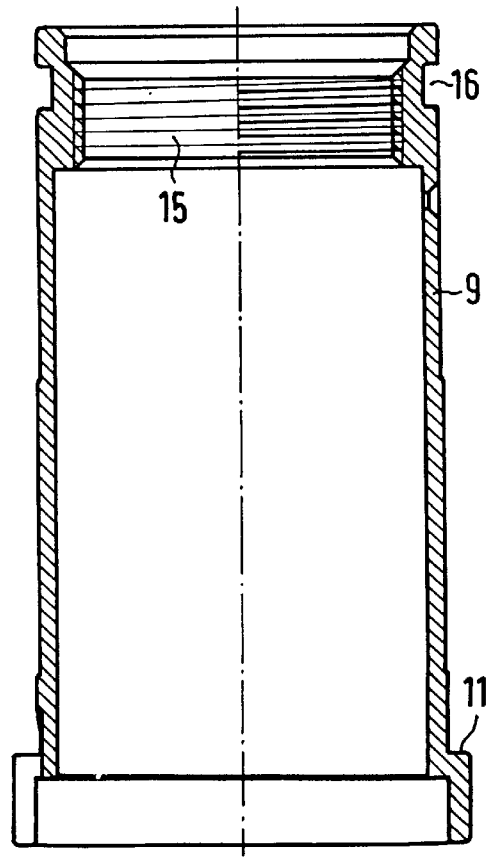
Figure 8:
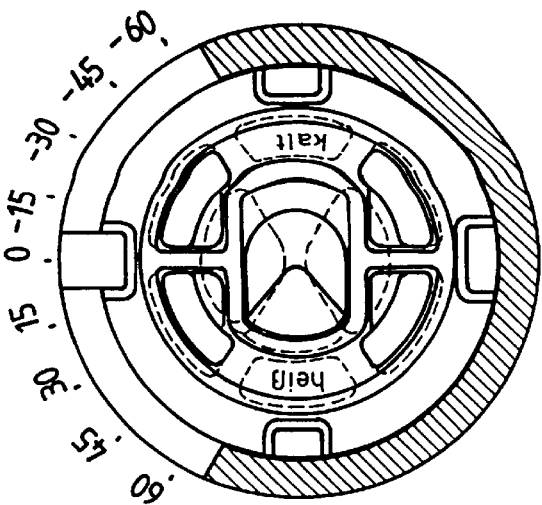
FIG. 8 shows a possibility where, starting from a middle position, by rotating to the right a first outlet is opened, whilst a rotation from the closed position to the left opens a second outlet.
Figure 7:
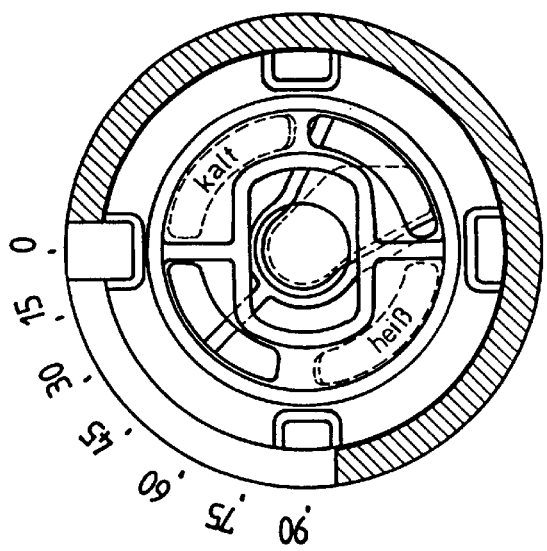
FIG. 7 shows an arrangement where the quantity and temperature of the outflow can be controlled. On opening the valve initially cold water is discharged by means of a bypass, whilst with increasing opening simultaneously the water temperature rises.
Figure 6:
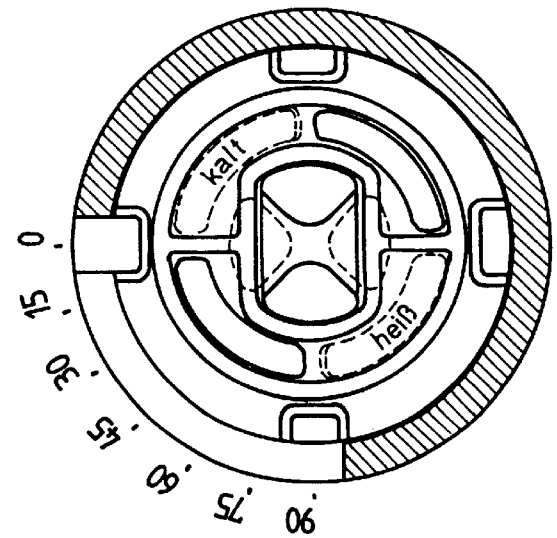
Figure 10:
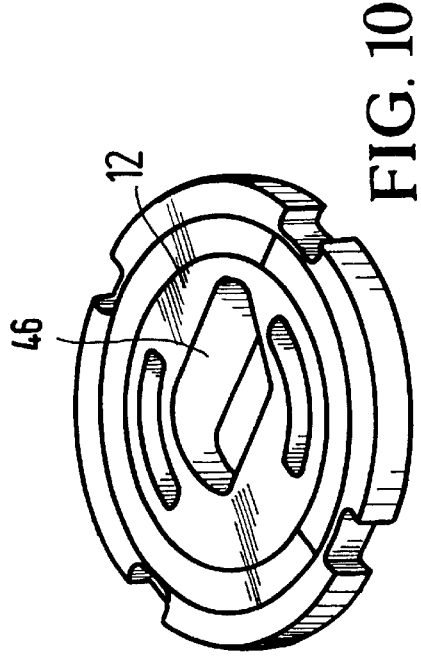
Figure 9:
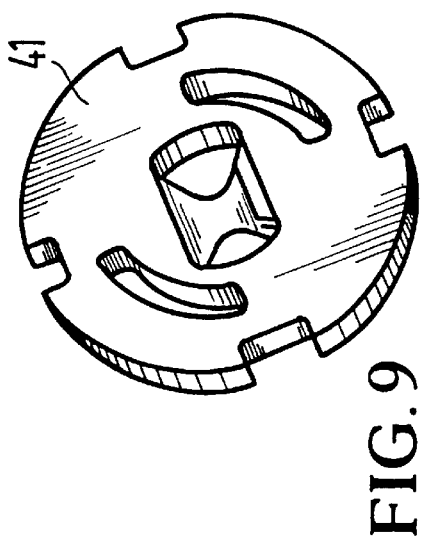

FIG. 10 perspectively shows the control disk of the sanitary fitting of FIG. 7. The fixed control disk 12 has an outlet opening 46, which is asymmetrical in order to form a bypass.

What is claimed is:

1. Cartridge for sanitary fittings, comprising a cartridge casing, a base terminating the cartridge casing, a distributor casting which is mounted in rotary manner in the cartridge casing, and a control device for controlling a water quantity leaving the fitting, wherein the control device is actuatable by rotating distributor casing, and wherein the valve type is changeable by replacing the control device with one of alternate control devices selected from a plurality of selectable control devices that are replaceably fittable in the cartridge and determine different output characteristics at given positions of the cartridge.

2. Cartridge according to claim 1, wherein the base of the cartridge casing is selectively replaceable.

3. Cartridge according to claim 1, further comprising a stop limiting rotary movement of the distributor casing and wherein the stop cooperates with a part of the control device that differs among the selectable control devices for at least partly determining said different output characteristics.

4. Cartridge according to claim 1, further comprising a thermostat located in the distributor casing, the thermostat being operable with said plurality of selectable control devices.

5. Cartridge according to claim 1, having a distributor located in the distributor casing and wherein the distributor forms water passages from the control device to the thermostat and from the thermostat back to the control device.

6. Cartridge according to claim 1, wherein rotation of the distributor casing defines an axis and wherein the water passes into and out of the cartridge along a direction of the axis.

7. Cartridge according to claim 1, wherein the selectable control devices include a disk control.

8. Cartridge according to claim 7, wherein the disk control comprises a movable control disk rotatable about a fixed axis.

9. Cartridge according to claim 1, wherein the control device comprises a quantity control.

10. Cartridge according to claim 1, wherein the control device comprises a changeover device between different outlets.

11. Cartridge according to claim 1, wherein the selectable control devices comprise a plurality of disk controls that differ in at least one of water passages defined in the disk controls, an operative result of relative rotation of the disk controls and the cartridge casing, and rotational limits on the disk controls.

12. Cartridge according to claim 11, wherein the selectable control devices differently determine at least one of control of quantity to one outlet, control of quantity to plural outlets and temperature by mixing of hot and cold sources.

13. Cartridge according to claim 11, wherein the selectable control devices comprise at least one of fixed and rotatable control disks.

* * * * *